United States Patent [19]

Rodi et al.

[11] Patent Number: 4,923,519
[45] Date of Patent: May 8, 1990

[54] MAGNETIC IRON OXIDE PIGMENTS AND A PROCESS FOR THEIR PREPARATION

[75] Inventors: Fritz Rodi, Moers; Peter Kiemle, Krefeld-Traar; Aloys Eiling, Bochum; Hendrik Kathrein, Jüchen-Aldenhoven, all of Fed. Rep. of Germany

[73] Assignee: Bayer Aktiengesellschaft, Leverkusen, Fed. Rep. of Germany

[21] Appl. No.: 91,059

[22] Filed: Aug. 31, 1987

[30] Foreign Application Priority Data

Sep. 13, 1986 [DE] Fed. Rep. of Germany ....... 3631193

[51] Int. Cl.$^5$ .............................................. C09C 1/22
[52] U.S. Cl. .................................. 106/459; 106/480; 428/403
[58] Field of Search ............... 106/304, 309, 459, 480; 427/129, 130; 428/403

[56] References Cited

U.S. PATENT DOCUMENTS

| 4,064,292 | 2/1976 | Schoenafinger et al. | 427/132 |
| 4,200,680 | 6/1975 | Sasazawa et al. | 428/403 |
| 4,267,207 | 5/1979 | Sasazawa et al. | 427/129 |
| 4,297,395 | 1/1980 | Buxbaum et al. | 427/127 |
| 4,371,567 | 2/1983 | Chamard et al. | 427/130 |
| 4,414,245 | 6/1982 | Timberlake et al. | 427/127 |
| 4,594,267 | 3/1985 | Honma et al. | 427/127 |
| 4,664,947 | 6/1984 | Mohammed Siddiq | 427/130 |

FOREIGN PATENT DOCUMENTS

| 988704 | 5/1976 | Canada . |
| 2036612 | 2/1971 | Fed. Rep. of Germany . |
| 2235383 | 2/1973 | Fed. Rep. of Germany . |
| 2243231 | 3/1974 | Fed. Rep. of Germany . |
| 2410517 | 3/1974 | Fed. Rep. of Germany . |
| 2526363 | 2/1976 | Fed. Rep. of Germany . |
| 2639250 | 3/1978 | Fed. Rep. of Germany . |
| 2650890 | 5/1978 | Fed. Rep. of Germany . |
| 2811473 | 9/1978 | Fed. Rep. of Germany . |
| 2829344 | 1/1979 | Fed. Rep. of Germany . |
| 2903593 | 8/1980 | Fed. Rep. of Germany . |
| 3038989 | 4/1981 | Fed. Rep. of Germany . |
| 3228021 | 2/1983 | Fed. Rep. of Germany . |
| 3344299 | 6/1984 | Fed. Rep. of Germany . |
| 3520210 | 12/1985 | Fed. Rep. of Germany . |
| 209353 | 4/1984 | Netherlands . |
| 1318579 | 5/1973 | United Kingdom . |
| 1441183 | 6/1976 | United Kingdom . |
| 2001942 | 2/1979 | United Kingdom . |
| 1583256 | 1/1981 | United Kingdom . |
| 1589355 | 5/1981 | United Kingdom . |
| 2060592 | 5/1981 | United Kingdom . |
| 2131783 | 6/1984 | United Kingdom . |

*Primary Examiner*—Amelia Burgess Yarbrough
*Attorney, Agent, or Firm*—Connolly and Hutz

[57] ABSTRACT

Magnetic iron oxide pigments having a monomolecular coating of a cobalt compound useful in magnetic signal recordings having a dependence of coercivity on temperature in the temperature range of from 76 K to 298 K of less than 0.13 kA/mK and having a coercivity on powder compressed to 0.9 g/cm$^3$ of greater than 51 kA/m are prepared applying a preliminary coating of Fe$_3$O$_4$ or a bertholloid compound to a magnetic iron oxide core material having the composition FeO$_x$ where x is a number from 1.33 to 1.55 and then covering the preliminary coating with a cobalt compound.

12 Claims, 1 Drawing Sheet

MAGNETIC IRON OXIDE PIGMENTS AND A PROCESS FOR THEIR PREPARATION

The present invention relates to magnetic iron oxide pigments covered with a monomolecular coating of cobalt compounds and to a process for the preparation of these magnetic iron oxide pigments.

BACKGROUND OF THE INVENTION $\gamma$-$Fe_2O_3$ magnetic pigments have coercivity values of up to about 31 kA/m while ferrite magnetic pigments have coercivity values of up to about 35 kA/m. Magnetic pigments with much higher coercivity field strengths are increasingly being used for magnetic signal recording in audio, video and data storage systems to obtain higher storage densities. Various methods are known for increasing the coercivity field strengths of magnetic iron oxides.

According to German No. 2,903,593, pigments with higher coercivity values are obtained from $\alpha$-FeOOH precursor compounds doped with cobalt. A coercivity field strength of about 620 Oe may be obtained with 1% cobalt and an FeO content of 20%. The disadvantage of these pigments lies in their low printing attenuation, insufficient magnetic stability and high degree of dependence of the coercivity on the temperature.

Another method of obtaining high coercivity field strengths has been described in German No. 2,235,383, in which a layer of cobalt ferrite is crystallized epitactically on a core of magnetic iron oxide in a strongly alkaline medium. These pigments have better values of printing attenuation and megnetic stability than the cobalt doped pigments but they are not entirely satisfactory in their control panel distribution, the temperature dependence of their coercivity, the cross-field stability and the long term ratio of erasure obtainable in tapes.

Methods for the preparation of magnetic iron oxide pigments with improved magnetostatic properties have been described in German No. 2,036,612, German No. 2,243,231, German No. 2,410,517 and German No. 2,289,344. In all these methods, a cobalt compound, generally cobalt hydroxide, is precipitated on the surface of the iron oxide core. Cobalt is subsequently enabled to diffuse into the zones of the core material near the surface by suitable measures.

Processes in which cobalt compounds and iron-(II) compounds are separately precipitated in several layers on the core of iron oxide pigments to improve the magnetostatic properties are described in German No. 3,520,210 and German No. 3,344,299.

Although some of the pigment properties can be improved by employing these methods, all the pigments obtained have the disadvantage of a relatively high cross-field instability and high temperature dependence of the coercivity. Iron oxide magnetic pigments with relatively low temperature dependence of the coercivity have been described in German Patent Specifications 2,650,890 and 2,639,250 but the pigments mentioned there have insufficient coercivity to be suitable for the production of video or audio tapes (operating point II).

The problem therefore still existed of finding a magnetic iron oxide pigment which would have sufficiently high coercivity values for the production of audio and video tapes as well as good magnetostatic properties with the coercivity largely independent of cross fields and changes in temperature as well as satisfactory values for printing attenuation.

BRIEF DESCRIPTION OF THE INVENTION

It has now surprisingly been found that these requirements are fulfilled by magnetic iron oxide pigments covered with a monomolecular coating of cobalt compounds, prepared by first coating the magnetic iron oxide pigment used as core with a layer of magnetite or a bertholloid iron oxide having the composition $FeO_x$ where x is from 1.33 to 1.5 and then applying the cobalt compound to this layer of magnetite.

DETAILED DESCRIPTION

These magnetic iron oxide pigments are a subject of this invention. They are magnetic iron oxide pigments with a monomolecular coating of cobalt compounds, characterised in that the variation of their coercivity with temperature in the temperature range of from 76 K. to 298 K. is less than 0.13 kA/mK. The cobalt content is preferably from 2 to 4%, depending on how finely divided the products are.

This invention also relates to a process for the preparation of the magnetic iron oxide pigments according to the invention. It is characterised in that a core of magnetic iron oxide having the composition $FeO_x$ where x is from 1.33 to 1.5 is first covered with $Fe_3O_4$ or a bertholloid compound having the composition $FeO_x$ ($1.33 < x < 1.5$) and this pre-coated core is then coated with a cobalt compound in the second stage of the process.

The magnetic iron oxide used as the core may be $\gamma$-$Fe_2O_3$ pigments, $Fe_3O_4$ pigments and bertholloid compounds having the composition $FeO_x$ ($1.33 < x < 1.5$). These iron oxides may also contain one or more accompanying elements from the group comprising P, Zn, B, Si, Sn, Ge, Al, Mn, Cr and Ni.

According to the invention, the initial coating is produced by means of an iron (II, III) salt having a Fe(III) content of from 0 to 67%. It is to be understood that Iron(II, III) means a mixture of Iron(II) and Iron(III) salts. This preliminary coating is most preferably carried out in an alkaline medium.

The coating may be applied by various methods: The iron oxide used as core can be dispersed in water and the iron salt or its solution and a solution of alkali added. The solution of alkali may be added before or after dispersion of the iron oxide and before or after addition of the iron salt solution.

The preliminary coating can be preferably carried out under oxidizing condition, most preferably using air as oxidizing agent. From 66 to 100% of the Fe(II) irons are oxidized by this method of oxidation or by the addition of other oxidizing agents. During application of the preliminary coating, oxidation is preferably continued until no more Fe(II) is present in the solution. Oxidation of the suspension may be carried out at temperatures from 20° C. to the boiling point.

Application of the iron compound is followed by application of the cobalt compound by way of addition of a cobalt salt to the pigment suspension. Application of the cobalt compound may be carried out under oxidizing or under inert conditions.

The cobalt compound used may be a Co(II) salt, in particular $CoSO_4.7H_2O$. Particularly satisfactory results are obtained if the compound applied has a cobalt content of from 0.5 to 10%, based on the material used as the core.

Application of the cobalt compound is preferably also carried out in an alkaline medium. The OH concentration both for application of the iron coating and for application of the cobalt compound is from 0.1 to 10 mol/l, preferably from 0.3 to 5 mol/l.

The solids content core material in the suspension is from 30 to 200 g/l, preferably from 50 to 150 g/l. The quantity of iron oxide applied amounts to 2 to 25% of the core material.

The pigment suspension is worked up by filtration, washing and drying.

The invention is described below with the aid of an example which is not to be regarded as a limitation of the invention.

To determine the properties of the magnetic iron oxide pigments according to the invention in the tape, about 200 g of the magnetic iron oxide are introduced in a polyurethane-based lacquer so that the proportion by volume of magnetic pigment is about 45%. The dispersion is ground in a bead mill for 3 hours and then applied as a thin layer to a sheet of polyester by means of a coating machine, orientated in a homogeneous magnetic field of 80 kA/m and hardened at 100° C. The following parameters are determined after the tape has been cut into segments suitable for testing:

$I^H c$, Coercivity determined at 398 kA/m

Br/Bs, remanent magnetization/saturation magnetization

OR, remanent magnetization transversely to the direction of the tape/remanent magnetization longitudinally to the direction of the tape SFD, control panel distribution Kd/dB), printing attenuation.

The cross field stability is determined by measuring the drop in $I^H c$ value of a tape which has been stored for 72 hours at 60° C. in a magnetic field of 200 kA/m in which the field vector is perpendicular to the mean orientation of the longitudinal axis of the needle. The pigments described may be used to produce tapes with improved recording properties, higher copying attenuation and improved long term values for the ratio of erasure.

The long term ratio of erasure is carried out on the basis of the specification published by the Victor Company (JVC) (point 7—7): a 1-kHz signal with a level of +10 dB above the level of the recording reference current is recorded on the audio track of a VHS cassette. The erasure ratio is determined by means of a selective level meter with a filter band width of 40 Hz
(a) immediately after recording and
(b) after a storage time of 100 h at 20° C.

All the quantities given in the following Examples are percentages by weight unless otherwise indicated.

EXAMPLE 1

9 m³ of an aqueous suspension of 1500 kg Bayferrox ® AC 5111M, Trade product of Bayer AG, are introduced into a 20 m³ stirrer vessel. The magnetic pigment has a coercivity of 33.8 kA/m, a FeO content of 24.2% by weight and a length to width ratio of about 8:1. 1222 kg of an 18.7% FeSO₄ solution are added to the suspension with stirring. Precipitation is then carried out with 1346 l of a 50% NaOH under a stream of nitrogen and the suspension is heated to 80° C. It is then gassed with air at the rate of 7.5 m³/h for 3 hours. After a solution of 200 kg of CoSO₄.7H₂O in 1353 m³ of water has been pumped in, the introduction of air is continued for a further 2 hours. The product is worked up by filtration, washing and drying.

COMPARISON EXAMPLE 1

10 m³ of an aqueous suspension of 1648 kg of Bayferrox ® AC 5111M, Trade product of Bayer AG, are introduced into a 20 m³ stirrer vessel. The magnetic pigment is identical to that of Example 1 and has a coercivity of 33.8 kA/m, an FeO content of 24.2% by weight and a length to width ratio of 8:1. 1269 kg of a 21.2% Fe₂SO₄ solution and a solution of 235.9 kg of CoSO₄.7H₂O in 1318 m³ of water are added to the suspension with stirring. Precipitation is then carried out by the addition of 1584 l of 50% NaOH under a stream of nitrogen and the suspension is heated to 80° C. After the suspension has been gassed with air for 3 hours, at 7.5 m³/h, the suspension is worked up by filtration, washing and drying.

The magnetic data of the magnetic iron oxide pigment are shown in Table 1.

TABLE 1

|  | Example 1 | Comparison Example 1 |
| --- | --- | --- |
| Powder: |  |  |
| $I^H c$ (kA/m) | 48.5 | 48.5 |
| Mr/g (mWb.m/kg) | 51.5 | 52.9 |
| Ms/g (mWb.m/kg) | 104.9 | 101.4 |
| Tape |  |  |
| $I^H c$ (kA/m) | 52.4 | 51.7 |
| Br/Bs | 0.90 | 0.86 |
| OR | 2.30 | 2.20 |
| SFD | 0.47 | 0.54 |
| KD (dB) | 55.0 | 51.5 |
| LD (dB) | >70.0 | 65 |
| LD₁₀₀ (DB) | 66.0 | 59.5 |
| $I^H c$ decrease in magnetic cross field | 1.6% | 4% |

The values obtained in Example 1 for Br/Bs, OR, control panel distribution, printing attenuation, erasure ratio and cross field stability are distinctly better than in the Comparison Example while the coercivity is almost the same.

Figure 1:
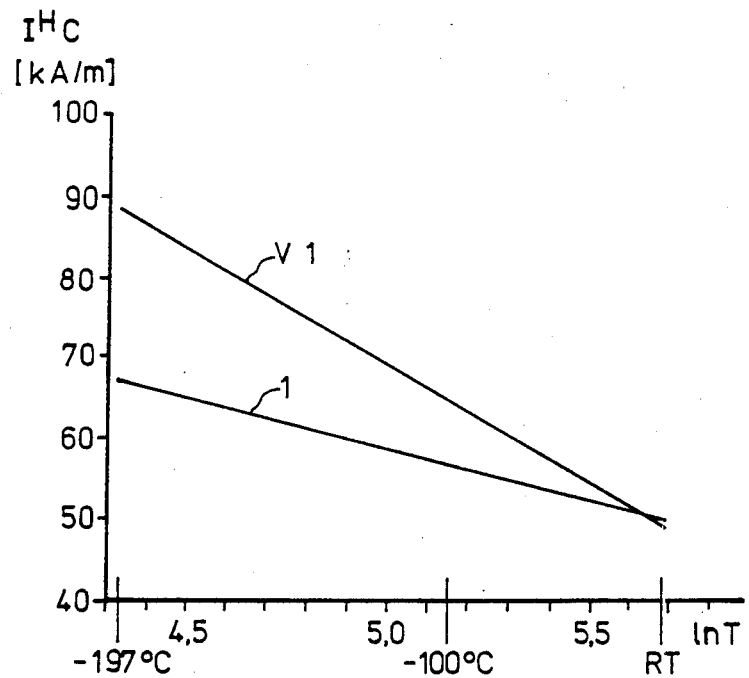
FIG. 1 illustrates the dependency of coercivity on temperature measured on the tape of Example 1.

FIG. 1 shows the variation of coercivity with temperature, measured on the tape.

HCl Mordanting of Cobalt-Coated Magnetic Pigment of Example 1 and Comparison Example 1

Method 20 g of the pigment to be investigated are dispersed in 500 ml of H₂O.

The suspension is transferred to the reaction vessel and heated to 40° C. with stirring. 300 ml of HCl (HCl conc. = 1 mol/l; temperature of solution 40° C.) are added at time t=0.

70 ml of suspension are removed at 2, 5, 10, 20, 40 and 80 minutes and filtered. The cobalt and iron concentration in the filtrate are determined analytically.

Calculation of the cobalt distribution

The Co/Fe ratio (for calculation see Table 2) is plotted against the degree of stripping by the mordant, which is calculated as follows:

$$\text{Degree of stripping (\%)} = \frac{(Co + Fe) \text{ in solution}}{(Co + Fe)_{pigment}} \cdot 100$$

With 0.8 l of solution and 20 g of pigment containing about 95% of (Fe$_3$O$_4$+CoFe$_2$O$_4$), the result obtained is:

$$\text{Degree of stripping (\%)} = \frac{([Co] + [Fe]) \cdot 0.8}{20 \cdot 0.95/\text{molar wt. (FeO}_{4/3})} \cdot 100$$

wherein

[Co]=cobalt concentration (mol/l)
[Fe]=iron concentration (mol/l)
Mol.weight (FeO$_{4/3}$)=molecular weight of Fe$_3$O$_4$, based on Fe. The atomic weight of Co is taken to be equal to that of Fe as an approximation.

Degree of stripping (%)=325 ([Co]+[Fe])

Figure 2:
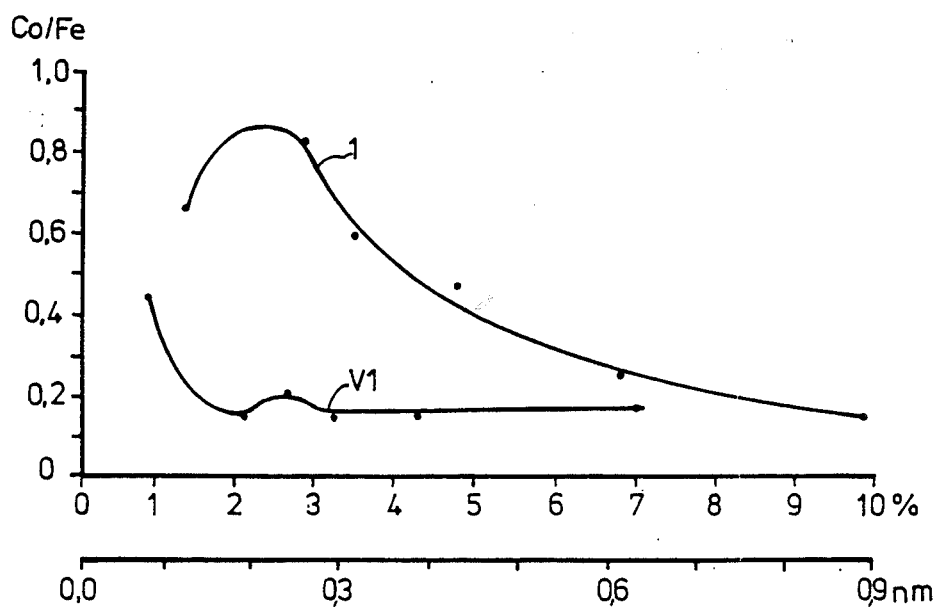
FIG. 2 illustrates the relationship between the CO/Fe ratio and the degree of stripping on one scale and the thickness of the stripped layer on a second scale.

The values entered in the graph of FIG. 2 prove that the magnetic iron oxide pigments according to the invention have a molecular coating of cobalt. In FIG. 2, the Co/Fe molar ratio is entered along the ordinate, the degree of stripping (%) is entered in the upper part of the abscissa and the thickness of the stripped layer (μm) in the lower part of the abscissa.

TABLE 2

| t (min) | Cobalt conc. mol/l | Iron conc. mol/l | Co/Fe ratio | Degree of Stripping with mordant % |
|---|---|---|---|---|
| 0 | 0 | 0 | $\dfrac{[Co]^1}{[Fe]^1}$ | $\dfrac{[Co]^1 + [Fe]^1}{2} \cdot 325$ |
| 2 | [Co]$^1$ | [Fe]$^1$ | $\dfrac{[Co]^2 - [Co]^1}{[Fe]^2 - [Fe]^1}$ | $\dfrac{[Co]^1 + [Co]^2 + [Fe]^1 + [Fe]^2}{2} \cdot 325$ |
| 3 | [Co]$^2$ | [Fe]$^2$ | $\dfrac{[Co]^3 - [Co]^2}{[Fe]^3 - [Fe]^2}$ | $\dfrac{[Co]^2 + [Co]^3 + [Fe]^2 + [Fe]^3}{2} \cdot 325$ |
| 10 | [Co]$^3$ | [Fe]$^3$ | $\dfrac{[Co]^4 - [Co]^3}{[Fe]^4 - [Fe]^3}$ | $\dfrac{[Co]^3 + [Co]^4 + [Fe]^3 + [Fe]^4}{2} \cdot 325$ |
| 20 | [Co]$^4$ | [Fe]$^4$ | $\dfrac{[Co]^5 - [Co]^4}{[Fe]^5 - [Fe]^4}$ | $\dfrac{[Co]^4 + [Co]^5 + [Fe]^4 + [Fe]^5}{2} \cdot 325$ |
| 40 | [Co]$^5$ | [Fe]$^5$ | $\dfrac{[Co]^6 - [Co]^5}{[Fe]^6 - [Fe]^5}$ | $\dfrac{[Co]^5 + [Co]^6 + [Fe]^5 + [Fe]^3}{2} \cdot 325$ |
| 80 | | | | |

What is claimed is:

1. Magnetic iron oxide pigments having a monomolecular coating of a cobalt compound wherein the temperature dependence of coercivity in the temperature range from 76 K. to 289 K. is less than 0.13 kA/mK and the coercivity on powder compressed to 0.9 g/cm$^3$ is from 50 to 51 kA/m.

2. Magnetic iron oxide pigments having a monomolecular coating of a cobalt compound according to claim 1 which comprises:
   (i) an iron oxide core of FeO$_x$ wherein x is a number from 1.33 to 1.5,
   (ii) a preliminary coating on the core of Fe$_3$O$_4$ or a bertholloid compound, and
   (iii) a coating of a cobalt compound over said preliminary coating.

3. Process for the preparation of the magnetic iron oxide pigments according to claim 1 which comprises applying a preliminary coating of Fe$_3$O$_4$ or a bertholloid compound to a magnetic iron oxide core material having the composition FeO$_x$ where x is a number from 1.33 to 1.55 then covering the preliminary coating with a cobalt compound.

4. Process according to claim 3 wherein the preliminary coating is applied as an iron(II,III) salt having a Fe(III) content of from 0 to 67%.

5. Process according to claim 3 wherein the preliminary coating is applied to the core under oxidizing conditions.

6. Process according to claim 5 wherein air is an oxidizing agent which produces the oxidizing conditions.

7. Process according to claim 3 wherein the preliminary coating is applied to the core in an alkaline medium.

8. Process according to claim 7 wherein the preliminary coating is applied to the core under oxidizing conditions which are maintained until no more Fe(II) component is found in the alkaline medium.

9. Process according to claim 3 wherein the cobalt compound is a Co(II) salt.

10. Process according to claim 9 wherein the cobalt compound is CoSO$_4$.7H$_2$O.

11. Process according to claim 3 wherein the preliminary coating is a manner that covered with cobalt in amounts from 0.5 to 10%, by weight, based on the core material.

12. Process according to claim 3 wherein the cobalt covering is applied to the preliminary coating in an alkaline medium.

* * * * *